(12) United States Patent
Yao et al.

(10) Patent No.: US 9,639,619 B2
(45) Date of Patent: May 2, 2017

(54) NETWORK ARCHITECTURE AND METHOD FOR REDUCING THE NUMBER OF RESOURCE REQUESTS

(75) Inventors: Xuefeng Yao, Waban, MA (US); Jack Jianxiu Hao, Lexington, MA (US); Diego S. Rozensztejn, Brookline, MA (US); Yuhui Qian, Burlington, MA (US); Jian Huang, Sudbury, MA (US); Zhiying Jin, Lexington, MA (US); John F. Gallagher, Hopewell, NJ (US); Michael R. Oliver, Wayne, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1186 days.

(21) Appl. No.: 12/607,317

(22) Filed: Oct. 28, 2009

(65) Prior Publication Data

US 2011/0099277 A1    Apr. 28, 2011

(51) Int. Cl.
| | |
|---|---|
| G06F 15/173 | (2006.01) |
| G06F 15/16 | (2006.01) |
| G06F 17/00 | (2006.01) |
| G06F 17/30 | (2006.01) |
| H04L 29/08 | (2006.01) |
| H04L 29/06 | (2006.01) |

(52) U.S. Cl.
CPC .... *G06F 17/30873* (2013.01); *H04L 63/0884* (2013.01); *H04L 67/2833* (2013.01); *H04L 67/2842* (2013.01); *H04L 63/083* (2013.01)

(58) Field of Classification Search
CPC ......... H04L 29/08144; H04L 29/08171; H04L 12/5695; H04L 29/0809; H04L 63/0428; G06F 2211/007
USPC ........................................................ 709/226
See application file for complete search history.

(56) References Cited

U.S. PATENT DOCUMENTS

| | | | | |
|---|---|---|---|---|
| 6,516,350 | B1* | 2/2003 | Lumelsky et al. | 709/226 |
| 7,139,811 | B2* | 11/2006 | Lev Ran et al. | 709/217 |
| 7,809,646 | B2* | 10/2010 | Rose | 705/51 |
| 2008/0228920 | A1* | 9/2008 | Souders et al. | 709/226 |
| 2010/0235329 | A1* | 9/2010 | Koren et al. | 707/687 |

* cited by examiner

*Primary Examiner* — Phuoc Nguyen
*Assistant Examiner* — Kishin G Belani

(57) ABSTRACT

A method may include receiving a primary resource in a user device, wherein the resource includes a plurality of addresses and each of the plurality of addresses identifying one of a plurality of additional resources. The method may further include aggregating the plurality of addresses and sending the aggregated addresses to a network device. The method may further include receiving the additional resources in the user device.

20 Claims, 13 Drawing Sheets

100

200

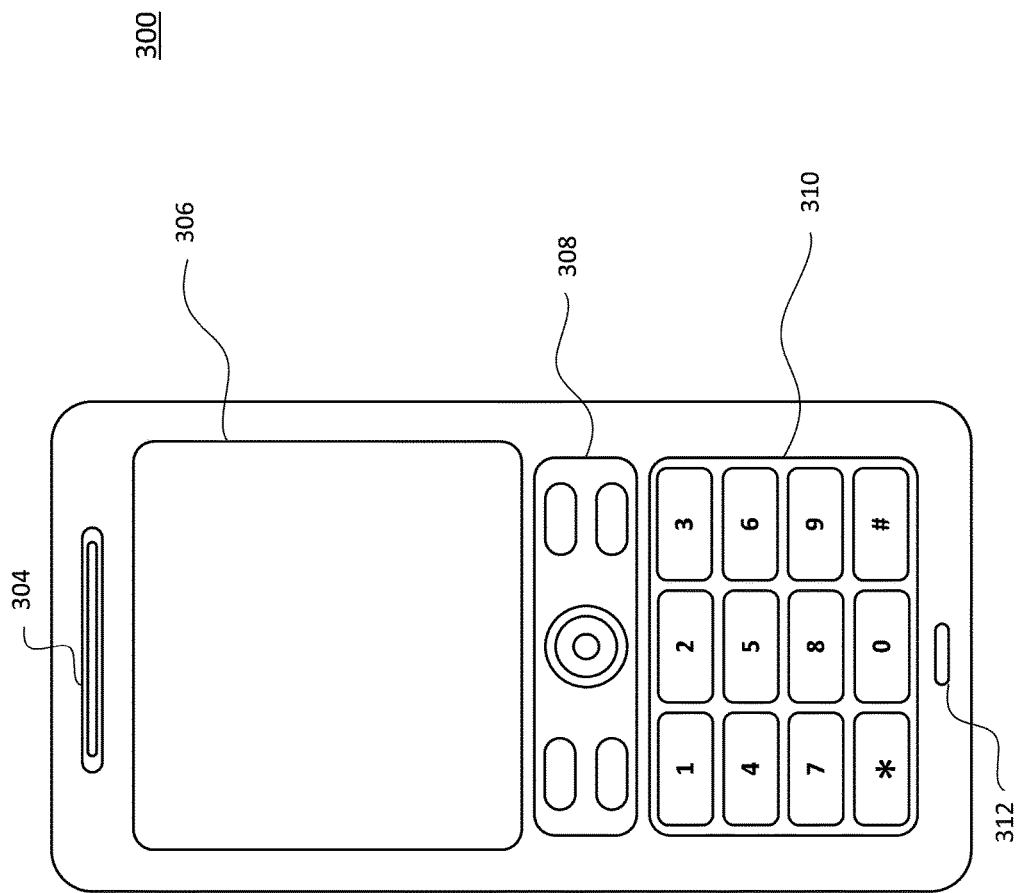

600

800

1000

NETWORK ARCHITECTURE AND METHOD FOR REDUCING THE NUMBER OF RESOURCE REQUESTS

BACKGROUND INFORMATION

Laptop and mobile phone users have become accustomed to browsing the Internet to shop, check social web sites, or view the latest news. Web sites and web pages often include images, video, and audio to enrich the user's experience. The increased use of the Internet may strain a service provider's network, including both wired and wireless networks.

BRIEF DESCRIPTION OF THE DRAWINGS

FIG. 3 is a block diagram of an exemplary user device;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Figure 1:
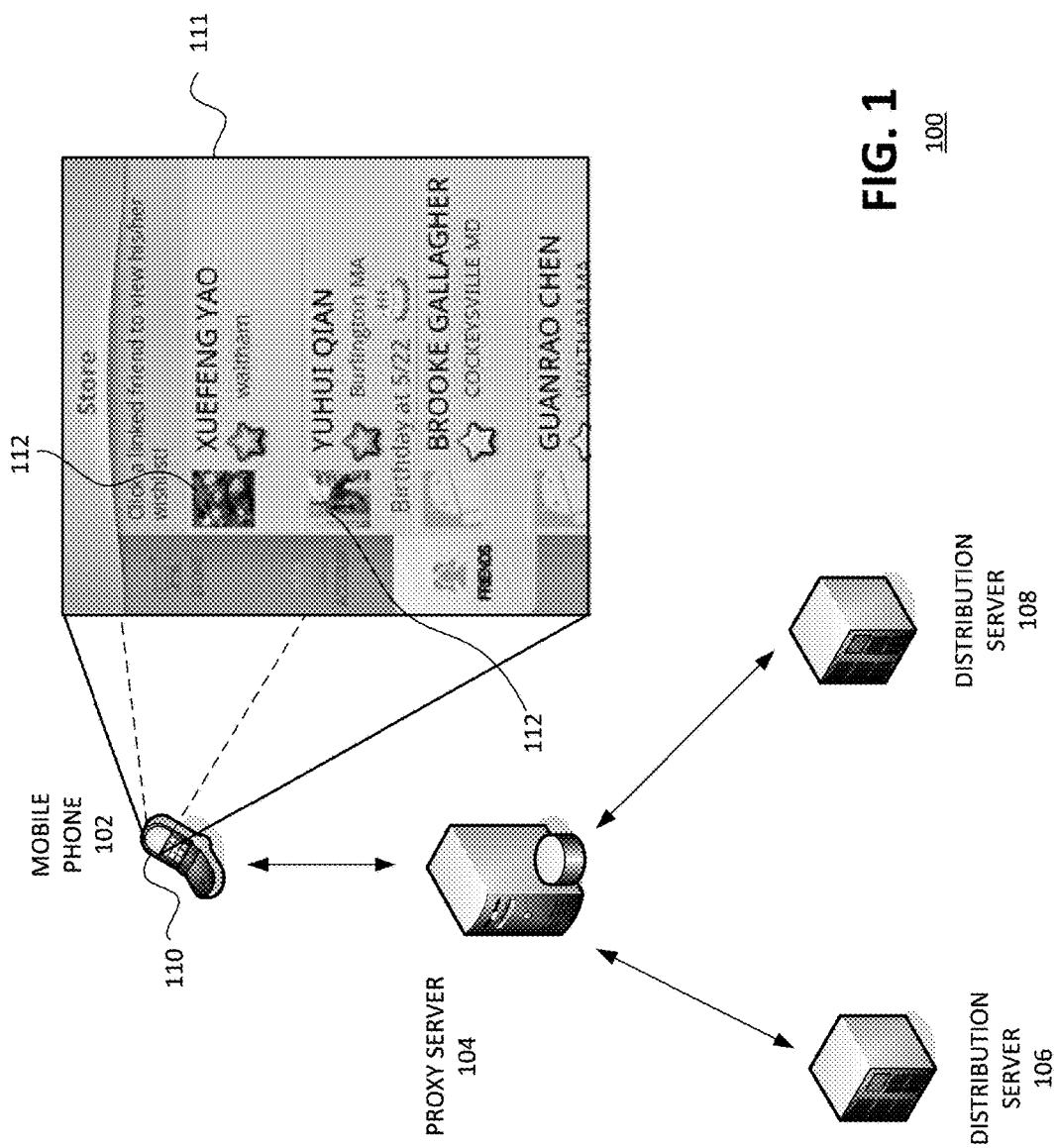
FIG. 1 is a diagram of an exemplary environment in which embodiments described below may be implemented.

FIG. 1 is a diagram of an exemplary environment 100 in which embodiments described herein may be implemented. Environment 100 may include a mobile phone 102, a proxy server 104, distribution server 106, and distribution server 108. A user of mobile phone 102 may browse the Internet to shop, check social web sites, or view the latest news. For example, as shown in FIG. 1, the user is browsing a social shopping web site. In this example, mobile phone 102 displays a web page 111 (e.g., a "resource") that includes many images 112. Each of these images 112 may themselves be resources that mobile phone 102 separately requests from various servers, such as distribution servers 106 or 108, and displays with web page 111 on display 110. Many additional resources, such as images 112, and the corresponding resource requests may frustrate the user's browsing experience. One or more embodiments disclosed herein provide a network architecture to carry resource requests, including requests for additional resources such as images 112. In one embodiment, resource requests may be aggregated by mobile phone 102. In another embodiment, the additional resources may be aggregated by proxy server 104 before sending the resources to mobile phone 102. Additional embodiments (including embodiments that do not aggregate requests or resources) are described below.

Figure 2A:
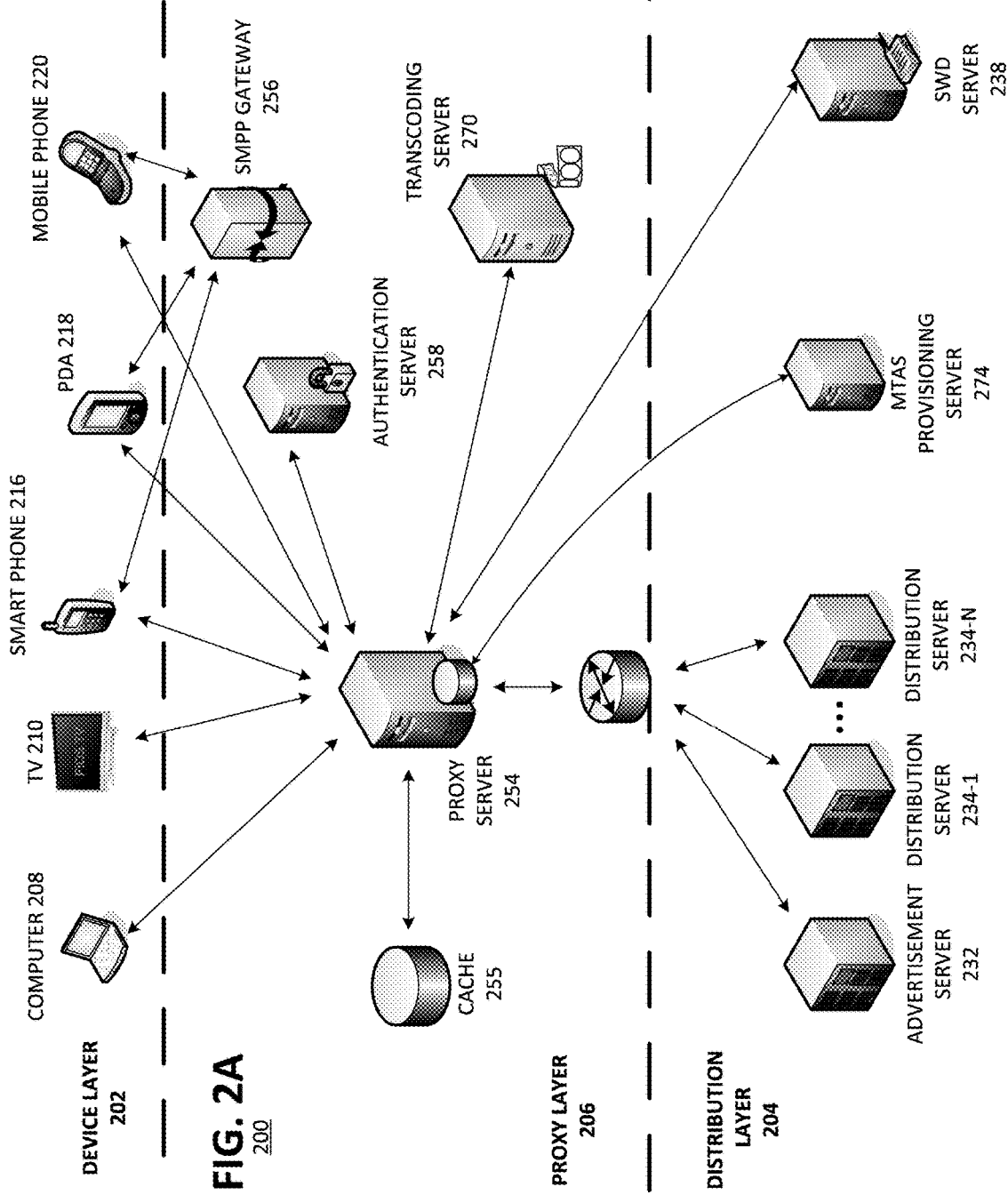
FIG. 2A shows an exemplary network in which embodiments described herein may be implemented.

FIG. 1 is a simplified configuration of one exemplary environment. Other environments may include more devices or a different arrangement of devices. For example, FIG. 2A shows an exemplary network 200 in which embodiments described herein may be implemented. FIG. 2A is described with respect to FIG. 2B, which is a block diagram of exemplary functional aspects of network 200. As shown, network 200 may include a device layer 202, a distribution layer 204, and a proxy layer 206. Proxy layer 206 may lie between device layer 202 and distribution layer 204 and may facilitate the exchange of messages (e.g., communications) between device layer 202 and distribution layer 204. Proxy layer 206 may also be referred to as "device proxy layer 206."

Device layer 202 may include, for example, a computer 208, a television (TV) 210, a smart phone 216 (e.g., a Blackberry™, a Palm Pre™, an HTC Dream™, etc.), a Personal Digital Assistant (PDA) 218, a mobile phone 220, and/or another type of communication device. Any of devices 208-220 may be considered "user devices." Computer 208 may include a laptop, desktop, or any other type of computing device. Computer 208 may include a browser application program for navigating a network, such as a public or private Internet or any other type of public or private network.

TV 210 may include a device capable of receiving and reproducing video and audio signals, e.g., a video display device. TV 210 may include a liquid crystal display (LCD), a cathode ray tube (CRT), a plasma display, etc. TV 210 may be associated with a set-top box (STB) (not shown). The STB may include a computer device, such as a cable card, for hosting programs, databases, and/or applications. In one embodiment, TV 210 may include the STB in the same housing. TV 210 and/or the STB may include an application, such as a browser application for navigating a network, such as a public or private Internet or any other type of public or private network. TV 210 and/or the STB may be associated with a remote control (not shown). The remote control may include control keys to navigate menus displayed on TV 210, for example, and to otherwise control functions of TV 210 and/or the STB.

Smart phone 216, PDA 218, and/or mobile phone 220 may allow a user to place telephone calls to other user devices. Smart phone 216, PDA 218, and/or mobile phone 220 may communicate with other devices via one or more communication towers (not shown) using a wireless communication protocol, e.g., GSM (Global System for Mobile Communications), CDMA (Code-Division Multiple Access), WCDMA (Wideband CDMA), GPRS (General Packet Radio Service), EDGE (Enhanced Data Rates for GSM Evolution), etc. In one embodiment, smart phone 216, mobile phone 220, and/or PDA 218 may communicate with other devices through a wireless local network using WiFi (e.g., IEEE 802.11x).

Figure 2B:
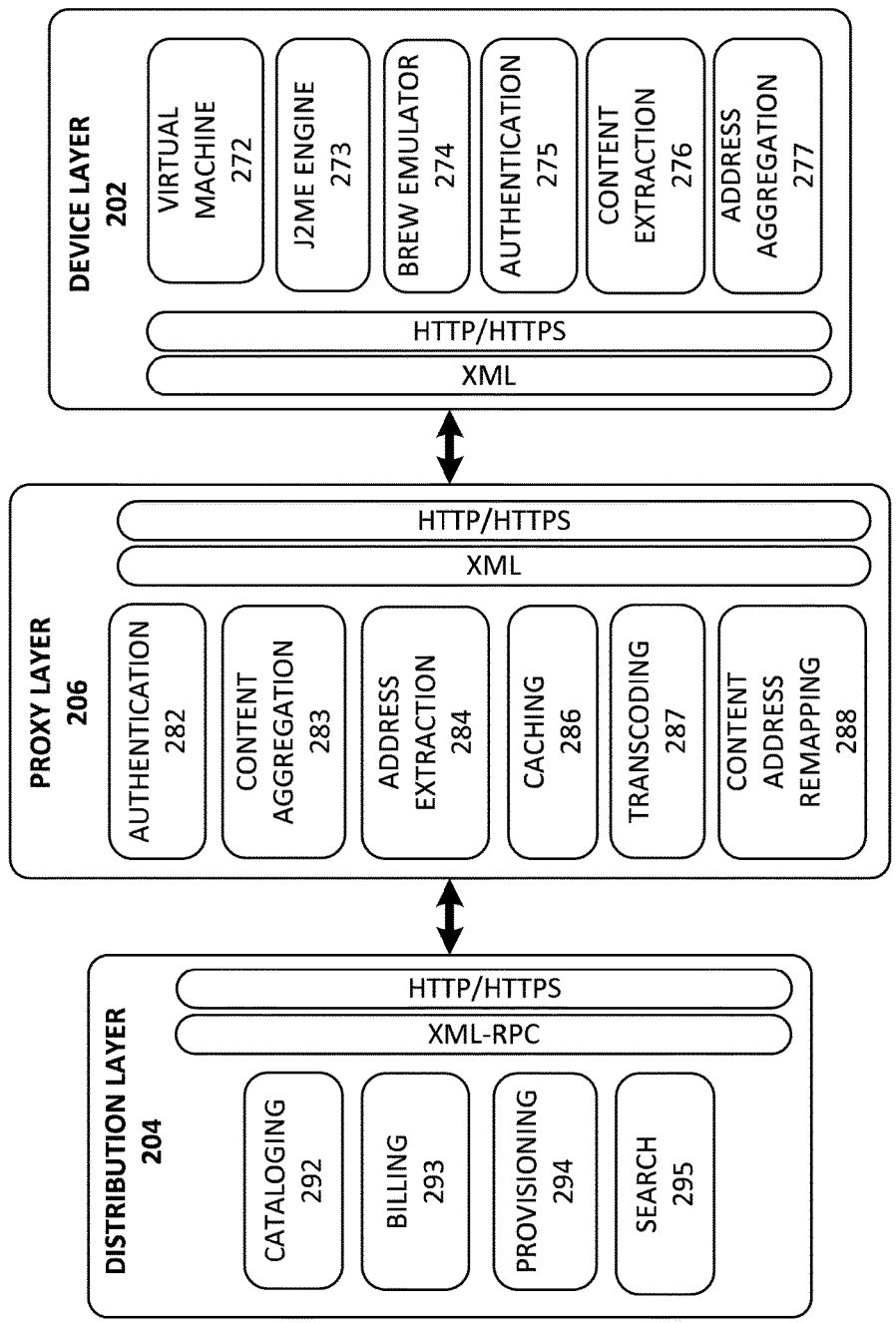
FIG. 2B is a block diagram of exemplary functional aspects of the network of FIG. 2A.

Referring to FIG. 2B, in one embodiment, user devices 208-220 may provide one or more of a virtual machine function 272, a J2ME engine function 273, or an function emulator 274. J2ME engine 273 may execute Java applications; emulator 274 may execute BREW applications; and VM 272 may execute applications created for the platform that VM 272 simulates. Other run-time environments for other platforms (other than those shown in FIG. 2B) are possible.

User devices 208-220 may also provide a content extraction function 276 for receiving aggregated content from proxy layer 206 and extracting (e.g., separate or disaggregate) the content for displaying on screen 306 (FIG. 3) or playing or displaying in a user device. User devices 208-220 may also provide an address aggregation function 277 for aggregating (e.g., collecting) address for additional content/resources found in a primary resource (e.g., a web page).

In other embodiments, devices 208-220 may also communicate with other devices via a wired network. For example, smart phone 216, mobile phone 220, and PDA 218 may communicate with other devices using a public-switched telephone network (PSTN) or the Ethernet protocol. Devices 208-220 may include an application, such as a browser application for navigating a network, such as a public or private Internet or any other type of public or private network. Applications for devices 208-220 may include Java™ applications (e.g., Java Micro Edition or J2ME), BREW (Binary Runtime Environment for Wireless) applications, or applications written in any other type of language.

Distribution layer 204 may include an advertisement (ad) server 232, distribution servers 234-1 through 234-N (collectively "distribution servers 234," individually "distribution server 234-*x*"), a service-wide directory (SWD) server 238, and a Mobile Telephone Activation System provisioning server 240 (MTAS server 240). Advertisement server 232 may store advertisements (e.g., resources including banner ads, text ads, or commercials) that are presented by TV 210, smart phone 216, PDA 218, or mobile phone 220. Ad server 232 may include multimedia and/or interactive content that may also request resources (e.g., images, video, and/or audio) from other devices, such as one of distribution servers 234 and/or a node on the Internet (not shown).

Distribution servers 234 may include a database to store and provide resources (e.g., content), such as videos (e.g., YouTube™ videos), photographs (e.g., Flickr™ collections), news (e.g., www.cnn.com™), games, applications, interactive web sites, ring tones, ring-back tones, and/or television broadcasts (e.g., NBC™, CBS™, ABC™, and Fox™). Distribution servers 234 may also include a database to store and provide on-demand content and services (e.g., music, video, and/or games on-demand). Distribution servers 234 may include a web server to serve content to user devices 208-220.

Resources stored in advertisement server 232 and/or distribution server 234-*x* may be identified and/or addressed by any type of addressing scheme, including URLs (Universal Resource Locators), URIs (Universal Resource Indicators), CIDs (a Content Identifier or content IDs), or IUDs (Resource Identifier or Resource IDs). As used herein, RID is used to generally refer to any of these addressing schemes. In one embodiment, a resource may be addressed or identified by more than one addressing scheme.

Referring to FIG. 2B, distribution server 234-*x* may provide content address remapping function 288 to convert one resource/content address to another resource/content address. For example, a content identifier (CID) may identify content by number (e.g., 5489032). This CID may be associated with a URL or URI. Remapping function 288 may input a CID, for example, and output the associated URL or URI. For example, the CID of 5489032 may be remapped to http://my.verizon.com/username/pic.jpg.

Distribution servers 234 may also provide a cataloging function 292 to allow a user to browse content stored in distribution layer 204 by, for example, category. Distribution servers 234 may also provide a searching function 295 to crawl and index content to allow a user to search for content stored in distribution layer 204.

SWD server 238 may include a database of user names, addresses, and/or corresponding device numbers (e.g., phone numbers, mobile device numbers, URIs, URLs). MTAS server 240 may store a database of information associating user names, device numbers, subscribed services and features, account commentary, account numbers, etc. In one embodiment, MTAS server 240 may provide a billing function 293 to associate activities initiated by a user device with a user account for later billing. In another embodiment, MTAS server 240 may provide a provisioning function 294 to allow users to sign up for services provided for by distribution layer 204 and obtain a username and password, for example.

Proxy layer 206 may include a proxy server 254, a cache database 255 ("cache 255"), an SMPP (Short Message Peer-to-Peer Protocol) gateway server 256, an authentication server 258, and a transcoding server 270. Proxy server 254 may receive communications from one or more user devices 208-220 for forwarding to other devices (e.g., distribution server 234-*x* and/or SMPP gateway 256). Proxy server 254 may also authenticate user devices (e.g., user devices 208-220) by, for example, communicating with authentication server 258 and/or distribution server 234-*x*. Referring to FIG. 2B, proxy server 254 may also provide an address extraction function 284 to receive aggregated content addresses from device layer 202 and extract (e.g., disaggregate) one or more of the content address in the aggregated addresses. Proxy server 254 may also provide a content aggregation function 283 to receive content from distribution layer 204 (e.g., using an extracted content address) and to aggregate the content, as described further below, for sending to device layer 202.

Authentication server 258 may store information related to device authentication, such as session cookies. Proxy server 254 may communicate with devices (e.g., user devices 208-220) using secure channels implementing, for example, SSL (Secure Socket Layer) protocols or TLS (Transport Layer Security) protocols. Referring to FIG. 2B, authentication server 258 may provide authentication function 282 for authenticating user devices, storing authentication tokens (e.g., cookies), and/or manage sessions.

Cache 255 may include a database to store content, such as frequently requested content (or expected to be frequently requested). For example, proxy server 254 may store images and/or videos that are frequently requested by any of user devices 208-220. Rather than requesting the content from distribution servers 234, proxy server 254 may access the content from cache 255. Accessing frequently requested content from cache 255 may allow content to reach user devices 208-220 faster than otherwise. Resources stored in cache 255 may also be identified and/or addressed by any type of addressing scheme, including URLs, URIs, a CDs, and/or a RIDs. In one embodiment, a resource may be addressed or identified by more than one addressing scheme. Referring to FIG. 2B, cache 255 may provide caching function 286.

SMPP gateway 256 may receive SMPP (e.g., SMS (Short Message System)) messages from Proxy server 254 and pass the received SMPP messages to user devices, such as user devices 216-220. SMPP gateway 256 may also receive SMPP messages from user devices 216-220, for example, and pass the received SMPP messages to Proxy server 254.

Transcoding server 270 may convert an audio, video, or graphic file from one format to another (e.g., from one bit rate to another bit rate, from one resolution to another, from one standard to another, from one file size to another, etc.). Transcoding server 270 may allow different audio, video, and/or graphic files to be displayed or played on any device in network 200. Examples of audio formats include MP3, WMA (Windows Media Audio), AAC (Advanced Audio Coding), QCP (Qualcomm Code Prediction), QCEP (Qualcomm Code Excited Linear Prediction), EVRC (Enhanced Variable Rate Codec), AMR (Adaptive Multi-Rate), Ogg Vorbis, etc. Transcoding server 270 may convert an audio file from any of these formats into any other one of these formats, for example, or into the same format but at a different rate, resolution, size, etc. Referring to FIG. 2B, transcoding server 270 may provide transcoding function 287 to convert an audio, video, or graphic file from one format to another.

As shown in FIG. 2B, in one embodiment, device layer 202 may communicate with proxy layer 206 using XML (eXtensible markup language) to wrap data and HTTP (hyper-text transfer protocol) as a transport mechanism (e.g., using the POST or GET request methods). Further, proxy layer 206 may communicate with distribution layer 204 using XML and/or XML-Remote Procedure Call (RPC), which is a protocol that uses XML to encode its calls and HTTP as a transport mechanism (e.g., using the POST or GET request methods).

In other embodiments, network 200 may include more, fewer, or different devices. Moreover, one or more devices 208-270 may perform one or more functions of any other device in network 200. Furthermore, one or more of devices 208-270 may be remotely located from each other, e.g., devices 208-270 may be geographically diverse. Although FIG. 2A shows devices 208-270 coupled to each other in a particular configuration, devices 208-270 may also be arranged in other configurations, either coupling directly with each other or through one or more networks, such that any one of devices 208-270 may communicate with any other one of devices 208-270. Devices 208-270 may communicate with any other one of devices 208-270 through the Internet, an ad hoc network, a local area network (LAN), a wide area network (WAN), a metropolitan area network (MAN), a cellular network, a PSTN, a high-speed fiber optic network (e.g., FiOS™), or any other network or combinations of networks.

Any of devices in network 200 (e.g., cache 255, proxy server 254, authentication server 258, SMPP gateway 256, or transcoding server 270) may include one or more computer systems for hosting programs, databases, and/or applications. For example, cache 255, proxy server 254, authentication server 258, SMPP gateway 256, or transcoding server 270 may each include a cluster of servers that may be geographically diverse. Such a cluster of servers may provide for scalability, load balancing, and reliability. Regarding scalability, as the number of users that subscribe to the services provided by distribution servers 234 increases, for example, the extra load may be borne by adding additional cache, transcoding servers, authentication servers, and/or proxy servers rather than replacing existing servers.

In one embodiment, proxy layer 206 may be a state-less and/or memory-less layer that passes information. In other embodiments, proxy layer 206 may store information on a temporary or permanent (e.g., redundant) basis, however, for other reasons, such as improved performance. In one embodiment, if proxy layer 206 (or part of proxy layer 206) fails or loses data, the data may be reconstituted or received from device layer 202 or distribution layer 204 as a new proxy layer takes hold. In one embodiment, requests between device layer 202 and proxy layer 206 and between distribution layer 204 and proxy layer 206 may include a state-less protocol, such as HTTP, to facilitate a state-less service proxy layer 206.

Because proxy layer 206 may, in one embodiment, be state-less, data requests between the device layer 202 and proxy layer 206 and between distribution layer 204 and proxy layer 206 may include the state parameters. For example, a data request from device layer 202 to proxy layer 206 may include state parameters such as a session cookie, a device number, a request, etc. In one embodiment, states may be permanently stored in device layer 202 (e.g., devices 208-220) or distribution layer 204 (e.g., one of distribution servers 234). In another embodiment, state parameters may be only temporarily stored in device layer 202 and/or distribution layer 204. A state-less proxy layer may allow for more efficient load-balancing of the data requests received in proxy layer 206. For example, data requests may be distributed more efficiently among different servers in a cluster.

As discussed above, user devices in network 200 may include computer 208, TV 210, smart phone 216, PDA 218, or mobile phone 220, for example. FIG. 3 is diagram of an exemplary user device 300, such as mobile phone 220. As illustrated, user device 300 may include a speaker 304, a display 306, control keys 308, a keypad 310, and a microphone 312. User device 300 may include other components (not shown in FIG. 3) that aid in receiving, transmitting, and/or processing data. Moreover, other configurations of user device 300 are possible.

Speaker 304 may provide audible information to a user of user device 300. Display 306 may include a display screen to provide visual information to the user, such as video images or pictures, and may include a touch-screen display to accept inputs from the user. For example, display 306 may provide information regarding incoming or outgoing telephone calls, telephone numbers, contact information, current time, voicemail, email, etc.

Control keys 308 may permit the user to interact with user device 300 to cause user device 300 to perform one or more operations, such as requesting resources from a network, for example. Control keys 308 may include soft keys that may perform the functions indicated on display 306 directly above the keys. Keypad 310 may include a standard telephone keypad and may include additional keys to enable inputting (e.g., typing) information into user device 300. Microphone 312 may receive audible information from the user.

Figure 4A:
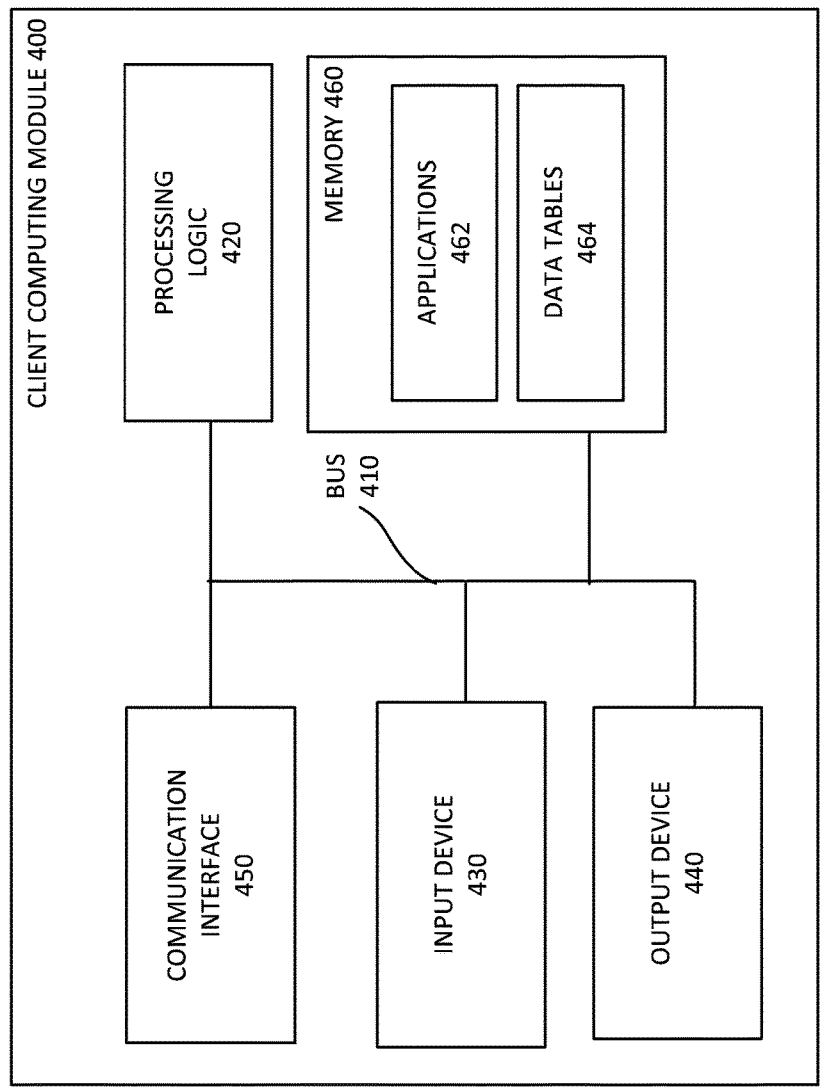
FIG. 4A is a block diagram of exemplary components of a client computer module.

FIG. 4 is a block diagram of exemplary components of a client computing module 400. User devices 208-220 may each include one or more computing modules 400. Client computing module 400 may include a bus 410, processing logic 420, an input device 430, an output device 440, a communication interface 450, and a memory 460. Client computing module 400 may include other components (not shown) that aid in receiving, transmitting, and/or processing data. Moreover, other configurations of components in client computing module 400 are possible.

Bus 410 may include a path that permits communication among the components of client computing module 400. Processing logic 420 may include any type of processor or microprocessor (or groups of processors or microprocessors) that interprets and executes instructions. In other embodiments, processing logic 420 may include an application-specific integrated circuit (ASIC), a field-programmable gate array (FPGA), or the like.

Input device 430 may permit a user to input information into client computing module 400, such as a keyboard (e.g., control keys 308 and/or keypad 310), a mouse, a pen, a microphone (e.g., microphone 312), a remote control, a touch-screen display (e.g., display 306), etc. Output device 440 may include a device that outputs information to the user, such as a display (e.g., display 306), a printer, a speaker (e.g., speaker 304), etc.

Input device 430 and output device 440 may allow the user to activate a particular service or application, such as a browser application. Input device 430 and output device 440 may allow the user to receive and view a menu of options and select from the menu options. The menu may allow the user to select various functions or services associated with applications executed by client computing module 400.

Communication interface 450 may include a transceiver that enables client computing module 400 to communicate with other devices and/or systems. Communication interface 450 may include a transmitter that may convert baseband signals to radio frequency (RF) signals and/or a receiver that may convert RF signals to baseband signals. Communication interface 450 may be coupled to an antenna for transmission and reception of the RF signals. Communications interface 450 may include a network interface card, e.g., Ethernet card, for wired communications or a wireless network interface (e.g., a WiFi) card for wireless communications. Communication interface 450 may also include, for example, a universal serial bus (USB) port for communications over a cable, a Bluetooth™ wireless interface for communicating with Bluetooth devices, a near-field communication (NFC) interface, etc. Communication interface 450 may implement a wireless communication protocol, e.g., GSM, CDMA, WCDMA, GPRS, EDGE, etc. Communications interface 450 may also receive, transmit and/or process digital or analog audio inputs/outputs and/or digital or analog video inputs/outputs.

Memory 460 may include a random access memory (RAM) or another type of dynamic storage device that may store information and instructions, e.g., an application, for execution by processing logic 420; a read-only memory (ROM) device or another type of static storage device that may store static information and instructions for use by processing logic 420; and/or some other type of magnetic or optical recording medium and its corresponding drive, e.g., a hard disk drive (HDD), for storing information and/or instructions.

Memory 460 may include applications 462 and data tables 464 (e.g., database). Applications 462 may include, for example, a browser to navigate a public or private network (e.g., the Internet). Data tables 464 may store data for use by applications 462.

Client computing module 400 may perform certain operations or functions, as described below. Client computing module 400 may perform these operations or functions in response to processing logic 420 executing software instructions contained in a computer-readable medium, such as memory 460. A computer-readable medium may include a physical or logical memory device. The software instructions may be read into memory 460 from another computer-readable medium or from another device via communication interface 450. The software instructions contained in memory 460 may cause processing logic 420 to perform processes that are described below.

Figure 4B:
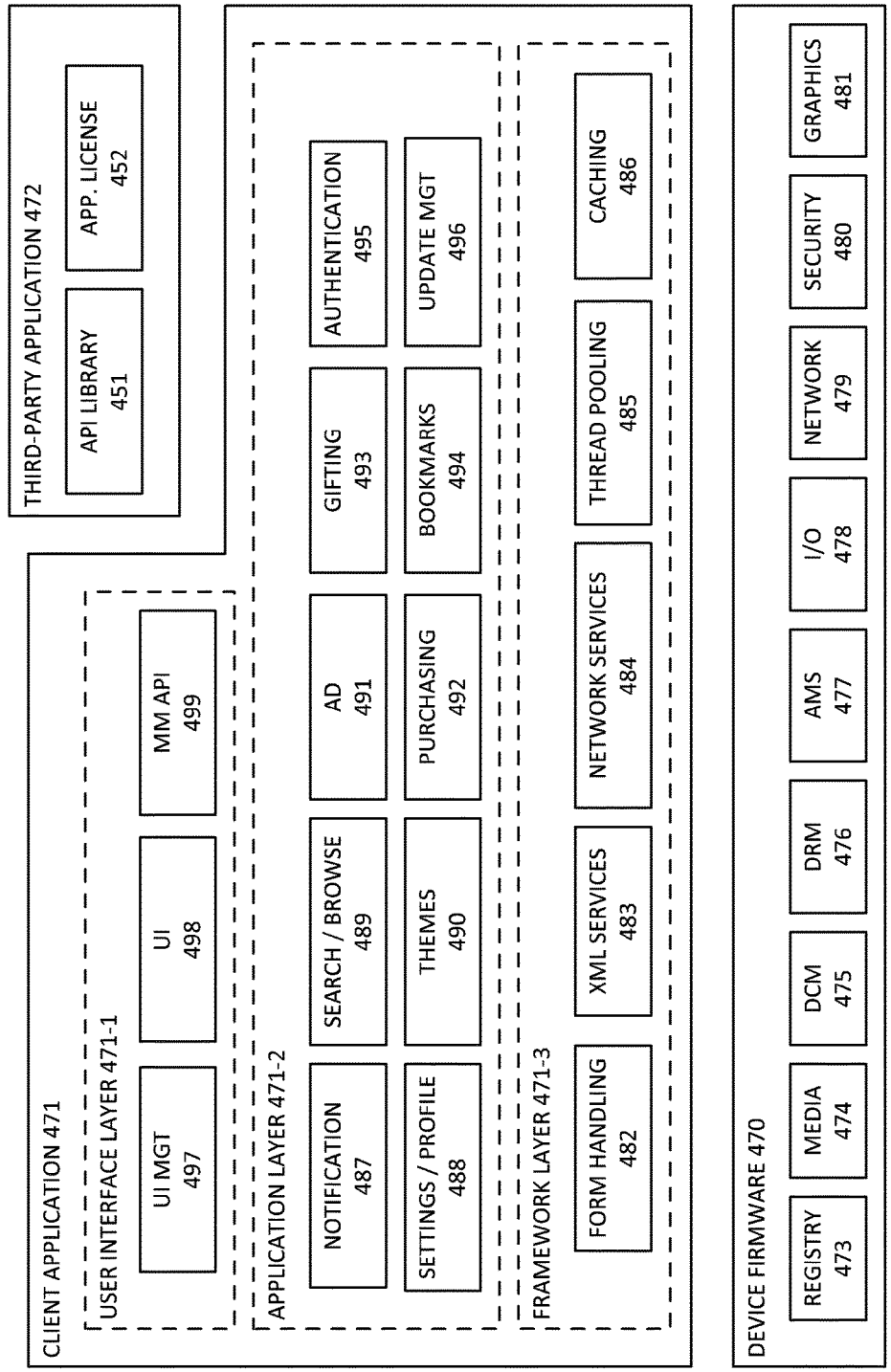
FIG. 4B is a block diagram of exemplary functions of the client computer module of FIG. 4A.

FIG. 4B is a functional block diagram of a user device, such as mobile phone 220, smart phone 216, or PDA 218. As discussed above, a user device may perform these functions in response to processing logic 420 executing software instructions. The exemplary user device may include a device firmware layer 470, a client application layer 471, and a third-party application layer 472.

Device firmware layer 470 may include a registry 473 function, a media (e.g., a memory card) function 474, DCM (Digital Clock Manager) function 475, a DRM (Digital Rights Management) function 476, an AMS (Application Management Services) function, an input/output function 478, a network function 479, a security function 480, and a graphics function 481. Functions 473-481 allow the user device to run applications (including applications that include graphical user interfaces (GUIs)), access media, securely communicate with wireless and wired networks.

Client application layer 471 may include a user interface layer 471-1, an application layer 471-2, and a framework layer 471-3. Application layer 471-2 and framework layer 471-3 may be referred to as a "services layer." Framework layer 471-3 may include a form handling function 482, an XML services function 483, a network service function 484, a thread pooling function 485, and a caching function 486. Form handling function 482 may include HTML and/or XHTML form processing functions. XML services function 483 may include an XML parser for receiving and sending data in an XML format. Network services function 484 may include functions such that the user device may register with a wireless carrier, for example. Thread pooling function 485 may allow the user device to run applications and/or threads simultaneously. Caching function 486 may allow the user device to store data locally rather than access a network to retrieve such data.

Application 471-2 layer may include a notification function 487, a settings/profile function 488, a search/browse function 489, a themes function 490, an advertisement function 491, a purchasing function 492, a gifting function 493, a bookmarks function 494, an authentication function 495, and an update management function 496. Notification function 487 may notify the user of the device of incoming phone calls, emails, text messages, etc. Settings/profile function 488 may allow the user to change the settings of the device (e.g., passwords, network settings, etc). In one embodiment, notification function 487 may receive a notification (e.g., a text message) and may launch an application (e.g., third-party application 472). Search/browse function 489 may allow a user to search and browse content in, for example, distribution servers 234. Themes function 490 may allow the user to select a "skin," different color options, etc. Ad function 491 may receive and display advertisements to the user of the device. Purchasing function 492 may allow the user to securely purchase merchandise and services using the device through the network. Gifting function 493 may allow the user to securely purchase merchandise and service to provide another user of a different user device. Bookmarks function 494 may allow the user to store favorite addresses for browsing. Authentication function 495 may authenticate applications, such as third-party application 472, and/or software updates. Authentication function 495 may also authenticate the user device and/or user for purchases of merchandise or services. Authentication function 495 may store session cookies for authenticating the user device. Update management function 496 may allow the update of application layer 471-2 and framework layer 471-3, among other layers.

User interface layer 471-1 may include a user interface (UI) management function 497, a UI function 498, and a multimedia (MM) application program interface (API) function 499. UI management function 497 and UI function 498 may include a Blackberry UI toolkit or a light-weight UI toolkit (LWIT). UI management function 497 and UI function 498 may allow the user to interact with applications including widgets, dialog boxes, etc. MM API function 499 may allow the user interface layer 471-1 and/or the user to play, pause, fast forward, reverse, etc., multimedia files.

Third-party application layer 472 may include an API library 451 and an application license 452. API library function 451 may allow the application to use the functionality of user interface layer 471-1, application layer 471-2, and/or framework layer 471-3. For example, third-party application 472 may access content and/or function in distribution layer 204. Application license function 452 may allow application layer 471-2 to authenticate the third party application, for example.

In one embodiment, application layer 471-2 and framework layer 471-3 (e.g., services layer) may be used across multiple hardware platforms/or and operating systems (e.g., an Android phone, a Windows Mobile phone, a Symbian phone, or an Apple iPhone). In this embodiment, the UI layer 471-1 may be different for each of the different hardware platform and/or operating system. Likewise, in this embodiment, device firmware layer 470 may be different for each of the different hardware platforms and/or operating system. Thus, application layer 471-2 and framework layer 471-3 (e.g., services layer) may be distributed as a unit to mobile phone manufacturers for customization into their respective firmware layers, UI layers, and third party applications.

Figure 5:
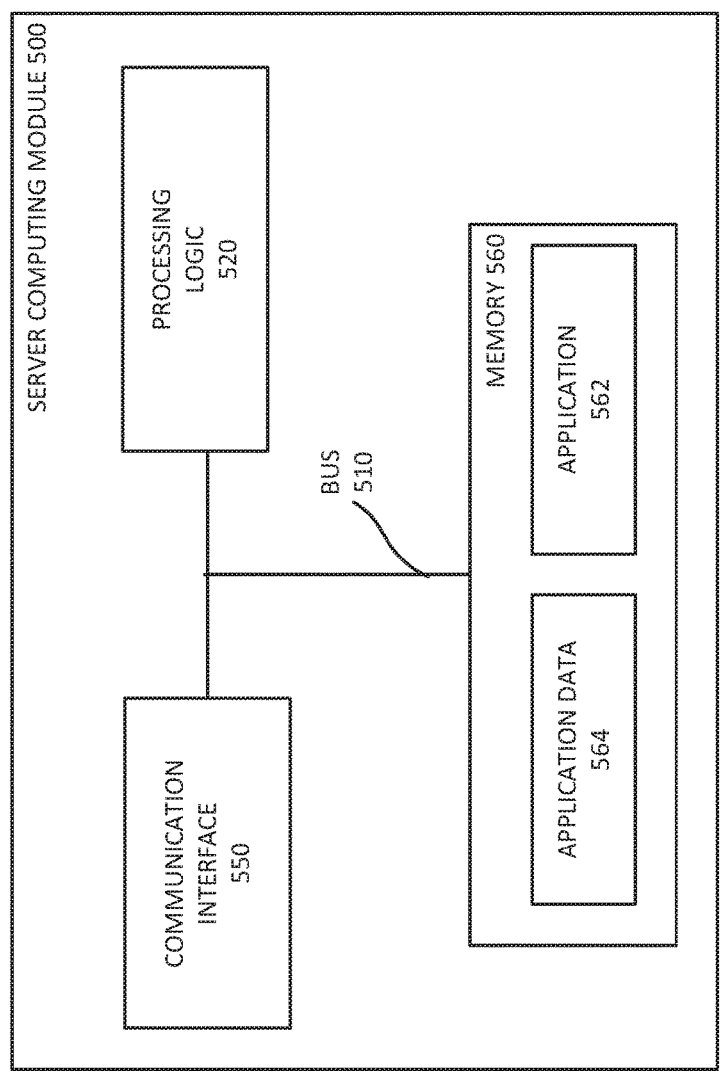
FIG. 5 is a block diagram of exemplary components of a server computing module.

As discussed above, distribution layer 204 and proxy layer 206 may include one or more servers. FIG. 5 is a block diagram of exemplary components of a server computing module 500. Each of devices in distribution layer 204 and/or proxy layer 206 may include one or more server computing modules (e.g., a rack of server computer modules), such as computing module 500. Server computing module 500 may include a bus 510, processing logic 520, a communication interface 550, and a memory 560. Server computing module 500 may include other components (not shown) that aid in receiving, transmitting, and/or processing data. Moreover, other configurations of components in module 500 are possible.

Bus 510 may include a path that permits communication among the components of module 500. Processing logic 520 may include any type of processor or microprocessor (or groups of processors or microprocessors) that interprets and executes instructions. In other embodiments, processing logic 520 may include an ASIC, an FPGA, or the like.

Communication interface 550 may include a transceiver that enables module 500 to communicate with other devices and/or systems. Communication interface 550 may include a transmitter that may convert baseband signals from processing logic 520 to RF signals and/or a receiver that may convert RF signals to baseband signals. Communication interface 550 may be coupled to an antenna for transmission and reception of the RF signals. Communications interface 550 may include a network interface card, e.g., Ethernet card, for wired communications or a wireless network interface (e.g., a WiFi card) for wireless communications. Communication interface 550 may also include, for example, a USB port for communications over a cable, a Bluetooth wireless interface for communicating with Bluetooth devices, a NFC interface, etc. Communication interface 550 may implement a wireless communication protocol, e.g., GSM, CDMA, WCDMA, GPRS, EDGE, etc. Communications interface 550 may receive, transmit and/or process digital or analog audio inputs/outputs and/or digital or analog video inputs/outputs.

Memory 560 may include a RAM or another type of dynamic storage device that may store information and instructions, e.g., an application 562 and application data 564, for execution by processing logic 520; a ROM device or another type of static storage device that may store static information and instructions for use by processing logic 520; and/or some other type of magnetic or optical recording medium and its corresponding drive, e.g., a HDD, for storing information and/or instructions.

In the case of distribution servers, for example, application 562 may include a database to store and provide content, such as videos, photographs, news, etc. Application 562 may also include a web server to serve the content stored in the database to user devices 208-220.

Module 500 may perform certain operations, as described in detail below. Module 500 may perform these operations in response to processing logic 520 executing software instructions contained in a computer-readable medium, such as memory 560. The software instructions may be read into memory 560 from another computer-readable medium or from another device via communication interface 550. The software instructions contained in memory 560 may cause processing logic 520 to perform processes that are described below.

Figure 6:
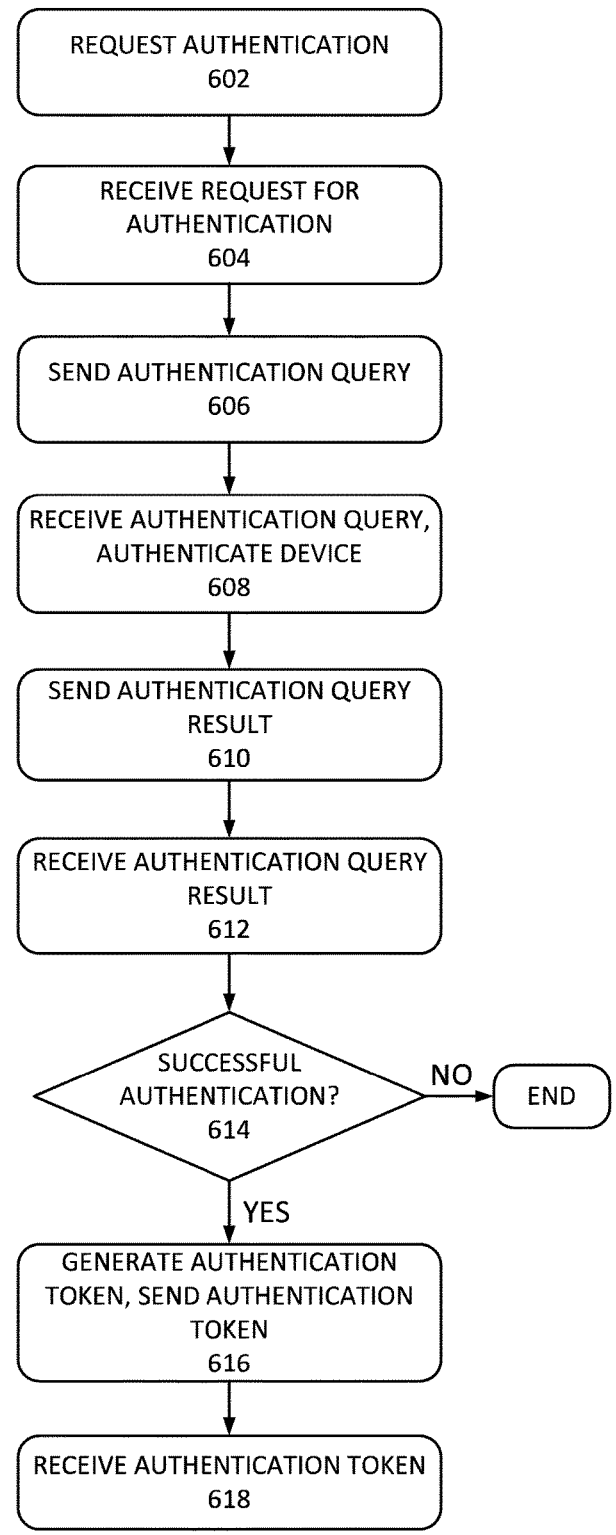
FIG. 6 is a flowchart of an exemplary process for authenticating a user device.
Figure 7:
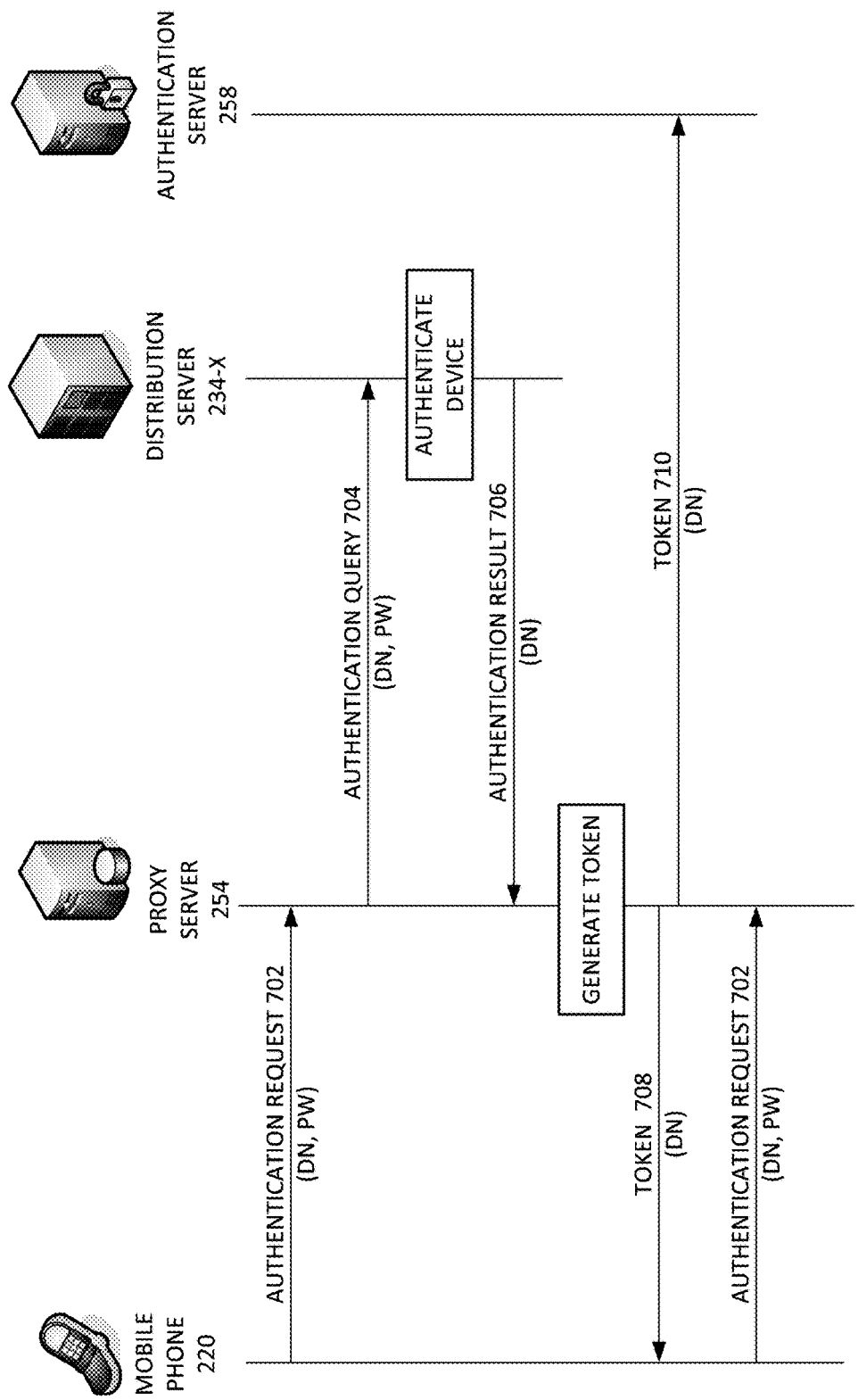
FIG. 7 is a diagram of exemplary network signals for authenticating a user device.

Before a user device (e.g., devices 208-220) can request and receive resources (e.g., content) from a distribution server 234-x, for example, the user device may be authenticated in network 200. FIG. 6 is a flowchart of an exemplary process 600 for authenticating a user device. FIG. 6 is discussed in relation to FIG. 7, which is a diagram of exemplary network signals for authenticating a user device. In one embodiment, process 700 may begin with a user device requesting authentication (block 602). As shown in FIG. 7, an authentication request 702 may be sent from mobile phone 220 to proxy server 254. In one embodiment, authentication request 702 may be sent from the user device to proxy server 254 in response to an interrogation message sent from proxy server 254 to the user device. For example, proxy server 254 may send an interrogation message (not shown in FIG. 7) to mobile phone 220. Authentication request 702 may include the device number (e.g., for mobile phone 220), and/or a password (e.g., a PIN). In one embodiment, the user of mobile phone 220 may be prompted for the password and/or the password may be stored in mobile phone 220 and automatically included in authentication request 702. The user may be prompted, for example, if the user changed the password through customer service or by configuring the user's profile online.

The authentication request may be received (block 604) by, for example, by proxy server 254 from mobile phone 220. For example, authentication request 702 sent by mobile phone 220 may be received by proxy server 254. An authentication query may be sent (block 606). To validate the password (e.g., authenticate the user device) proxy server 254 may send an authentication query 704 to distribution server 234-x, e.g., the distribution server having the content and in which the user device is associated with an account. Authentication query 704 may include the password and device number received from the user device, e.g., mobile phone 220, in authentication request 702. The authentication query may be received and the device may be authenticated (block 608). For example, as shown in FIG. 7, distribution server 234-x may receive authentication query 704 and may authenticate mobile phone 220 may comparing the password received in authentication query 704 with a password stored in distribution server 234 and associated with the device number.

An authentication result may be sent (block 610) from, for example, a distribution server to a proxy server. For example, as shown in FIG. 7, distribution server 234-x may send authentication result 706 to proxy server 254 to indicate whether the authentication of mobile phone 220 was successful or unsuccessful. The authentication result may be received (block 612) in proxy server 254. In the above example, proxy server 254 may receive authentication result 706 (block 612), which may indicate whether or not the password sent in authentication query 704 is the correct password for the associated device number.

If the authentication result indicates the password is correct (block 614: YES), then an authentication token (e.g., "cookie") may be generated (e.g., by a proxy server) and sent (block 616) to, for example, the user device and an authentication server. In the example of FIG. 7, a token 708 is sent from proxy server 254 to mobile phone 220. The user device (e.g., mobile phone 220) may receive the token (block 618). Also in this example, token 710 (which may include the same code as in token 708) may be sent to authentication server 258 for future authentication, for example, with the same device number for the same session. The authentication token may include a unique code associated with the device number (e.g., a code that may be unique to the user device). If the authentication result indicates the password is not correct (block 614: NO), then process 700 may end, as the request may not be authentic.

Figure 8:
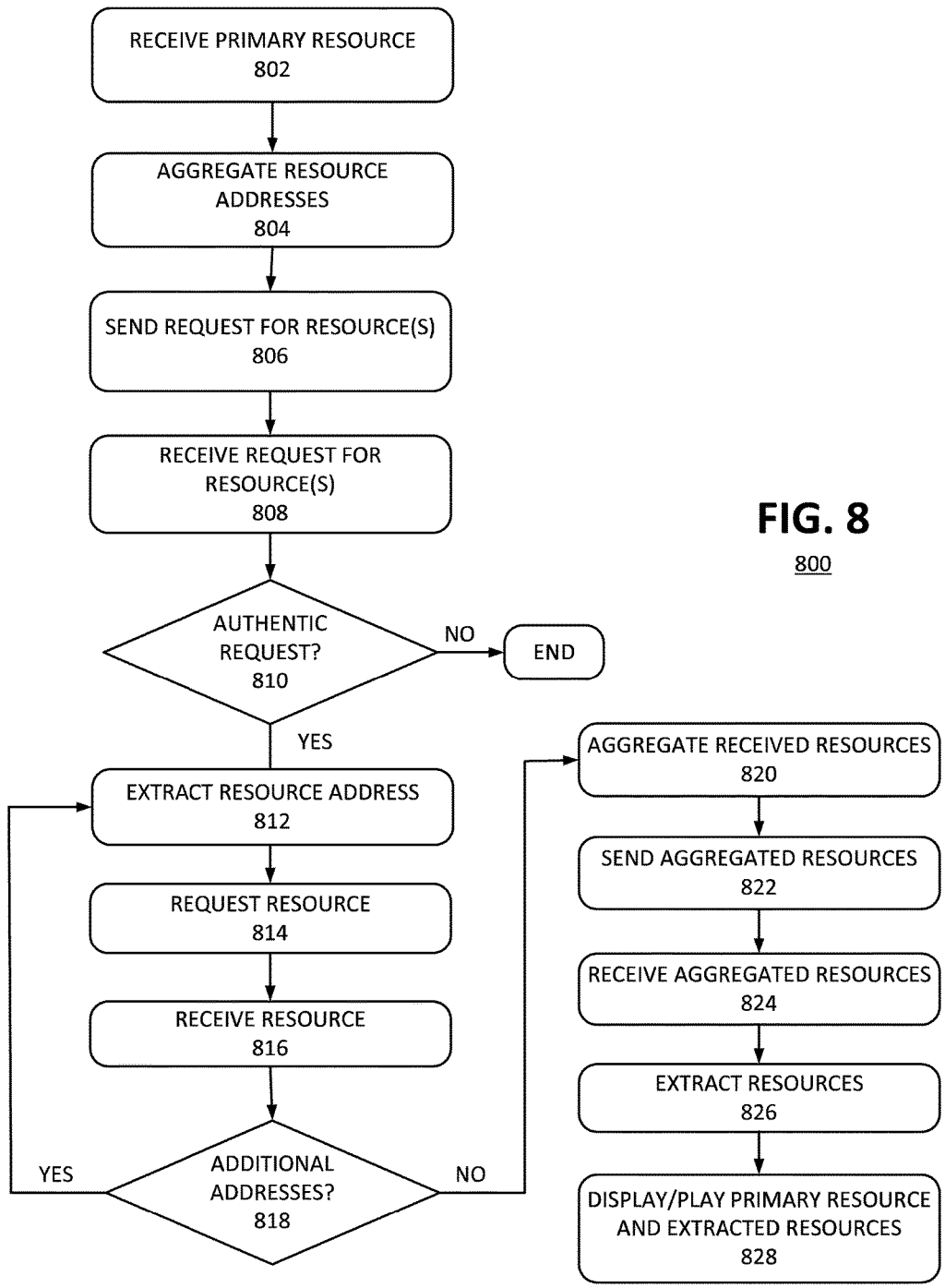
FIG. 8 is a flowchart of a process for requesting resources.

In one embodiment, a user device may request and receive resources (e.g., content) after being authenticated. FIG. 8 is a flowchart of a process 800 for requesting resources. FIG. 8 is discussed in relation to FIG. 9, which is a diagram of exemplary network signals for requesting resources. Process 800 may begin when a user device, such as mobile phone 220, receives a resource (e.g., a "primary resource") (block 802) that includes one or more addresses (e.g., RIDs, CIDs, URIs or URLs) of additional resources. Referring to the example of FIG. 9, mobile phone 220 may receive a web page (e.g., www.nytimes.com) as a primary resource 900 that includes additional resource addresses (e.g., RIDs, CIDs, URIs, URLs, links, etc.) to other resources (e.g., images, video, audio, etc).

The addresses for the additional resources may be aggregated (block 804). For example, a user device (e.g., processing logic 420 of mobile phone 220) may extract the addresses (e.g., RIDs, CIDs, URIs, URLs, etc.) for the additional resources from a web page being displayed on display 306. Mobile phone 220 may aggregate the addresses into a single file, for example. In another embodiment, the addresses may be grouped into multiple files, but, in this embodiment, fewer files than the number of additional resources. The file(s) may list the additional resources using XML, for example.

Figure 9:
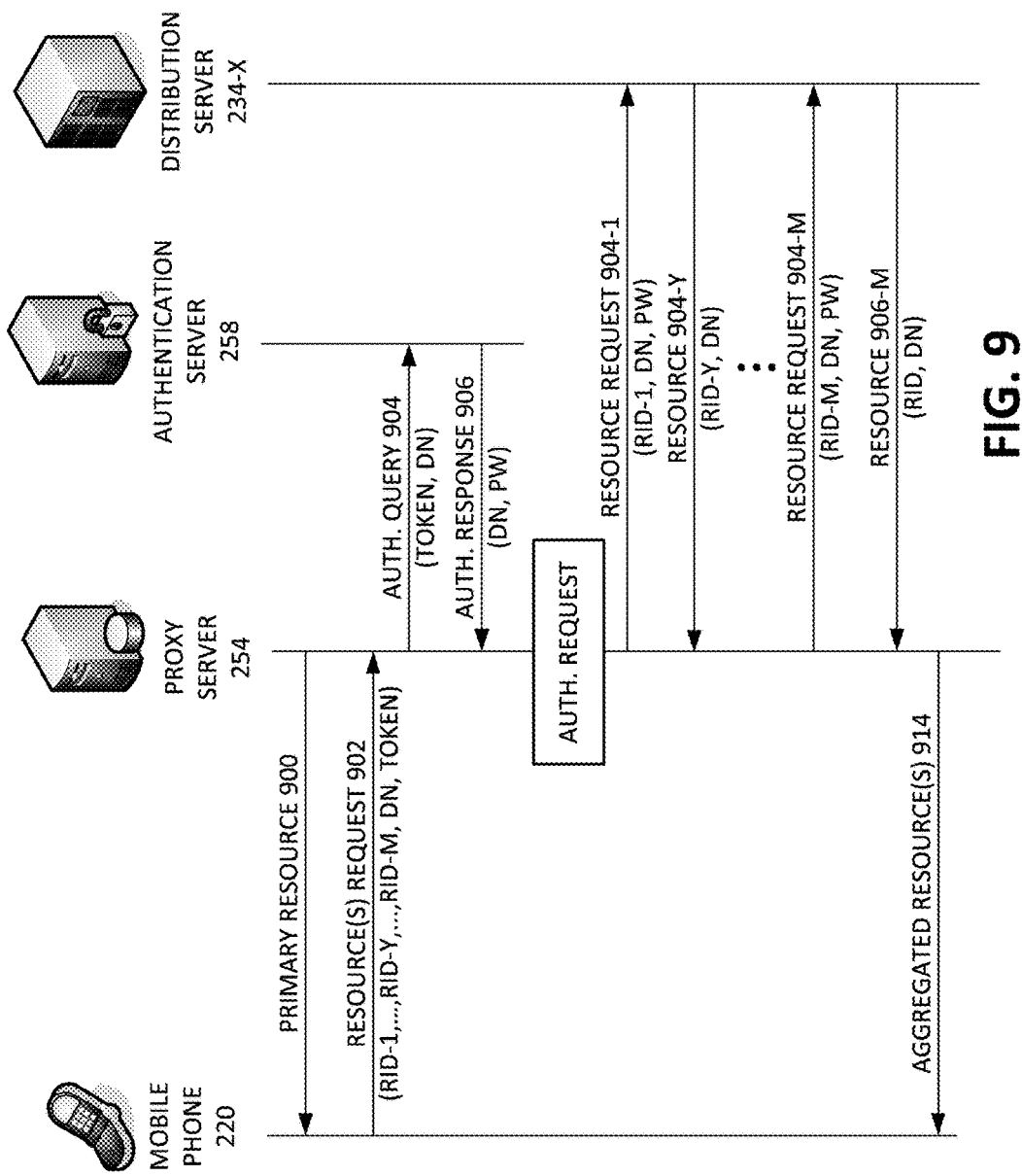
FIG. 9 a diagram of exemplary network signals for requesting resources.

The request for resource(s) may be sent (block 806) from, for example, the user device to a proxy server. In the example of FIG. 9, mobile phone 220 may send resource request 902 to proxy server 254. Resource request 902 may include the aggregated list of resource addresses, which, in this example, includes RIDs. Request 902 may also include a token for authentication. In this example, the token may be the same token as passed to mobile phone 220 from proxy server 254 in token message 708 of process 600. In another embodiment, one or more (or all) of the resources addresses may be sent individually rather than in an aggregated manner. In this embodiment, the aggregated address may be sent in fewer requests and/or data calls (e.g., a single request or data call) than the number of resources, which may decrease latency.

The request for the resource(s) may be received (block 808) by the proxy server, for example, from the user device. Referring to FIG. 9, resource(s) request 902 may be received by proxy server 254. The authenticity of the request for resource(s) may be determined (block 810). Proxy server 254 may send an authentication query 904 to authentication server 258 to determine whether request 902 is authentic. In one embodiment, authentication query 904 may include the device number that sent request 902 and the token that came with request 902. Authentication server 258 may compare the token and device number received in authentication query 904 with a device number and token value previously stored in authentication server 258. The device number and token value previously stored may have been received in token message 710 during process 600, for example. Authentication server 258 may send an authentication response 906 to proxy server 254 with the result of the comparison of the two tokens (e.g., authentic or not authentic). In one embodiment, if request 902 is authentic, then authentication response 902 may include a password associated with the device number.

If the request for resource(s) is not authentic (block 810: NO), then process 800 may end. If the request is authentic (block 810: YES), then a resource address may be extracted (block 812) from the received request for resource(s). A resource may be requested (block 814) using the extracted resource address. Referring to FIG. 9, proxy server 254 may extract the resource addresses from resource(s) request 902. Proxy server 254 may then request the resource associated with the extracted resources addresses from distribution server 234-x. In FIG. 9, a first resource request 904-1 may include the resource ID, the device number, and the password associated with the device number. The password associated with the device number may have been obtained from the authentication response message 906.

The resource may be received (block 816) by the proxy server, for example, from a distribution server. Referring to FIG. 9, proxy server 254 may receive a resource 906-1 from distribution server 234-x. If the aggregated address list includes an additional address identifying a resource (block 818: YES), then another resource address may be extracted (block 812), requested (block 814), and received (block 816). In the example of FIG. 9, proxy server 254 may send resource request 904-y (where y represents an integer between 2 and M, where M is the number of addresses in request 902) to distribution server 234-x. Distribution server 234-x may respond with resource 906-z (where Z is a number between 2 and M). In other words, proxy server 254 may repeatedly request the resources specified in request 902 until there are no more resources to request. Thus, if the request for resources does not include any additional request for resources (block 818: NO), then the received resources may be aggregated (block 820).

The aggregated resources may be sent (block 822) to the user device from the proxy server, for example. In one embodiment, proxy server 254 may aggregate resources 1 through M before sending the resources to mobile phone 220. In this embodiment, resources 1 through M may be sent to mobile phone 220 as resource(s) message 914. In another embodiment, proxy server 254 may aggregate a number of resources (less than M) and send them in resource message 914 to mobile phone 220. The remaining resources may be sent in a subsequent resource message (not shown). For example, if there is a size above which sending resource signal 914 is not efficient, then resource signal 914 may be broken into multiple messages. In this embodiment, the number of resource signals (e.g., resource signal 914) is less than the number of resources M in request 902. In this embodiment, content aggregation may reduce the number of requests and/or data calls between device layer 202 and proxy layer 206 (e.g., to a single data call and/or request).

The aggregated resources may be received (block 824) by the user device. Referring to FIG. 9, mobile phone 220 may receive resource message 914. The resources may be extracted (block 826). The extracted resources (e.g., the additional resources) may be displayed or played, for example, along with the primary resource. Mobile phone 220 (e.g., processing logic 420) may extract the resources to display on display 306 of mobile phone 220. In an alternative embodiment, one or more of the additional resources may be sent to the user device individually, rather than in an aggregated manner. In this embodiment, content extraction may reduce the number of requests and/or data calls between device layer 202 and proxy layer 206 (e.g., to a single data call and/or request). The resources may then be displayed/played (block 828) by, for example, mobile phone 220.

As discussed above, proxy server 254 may cache requested resources (e.g., frequently requested resources). In such an embodiment, proxy server 254 may be able to respond to a resource request from a user device faster than if proxy server 254 had to re-request the resource from distribution server 234-x. In addition, each user device 208-220 may have different capabilities (e.g., include a different size screen, different audio output abilities, and/or different processor speeds (e.g., for playing video)). In this situation, proxy server 254 may deliver resources (e.g., content such as applications, games, images, video, and/or audio) in a format suited for the particular device. In one embodiment, proxy server 254 may also cache resources in different formats suited different devices with different capabilities.

Figure 10:
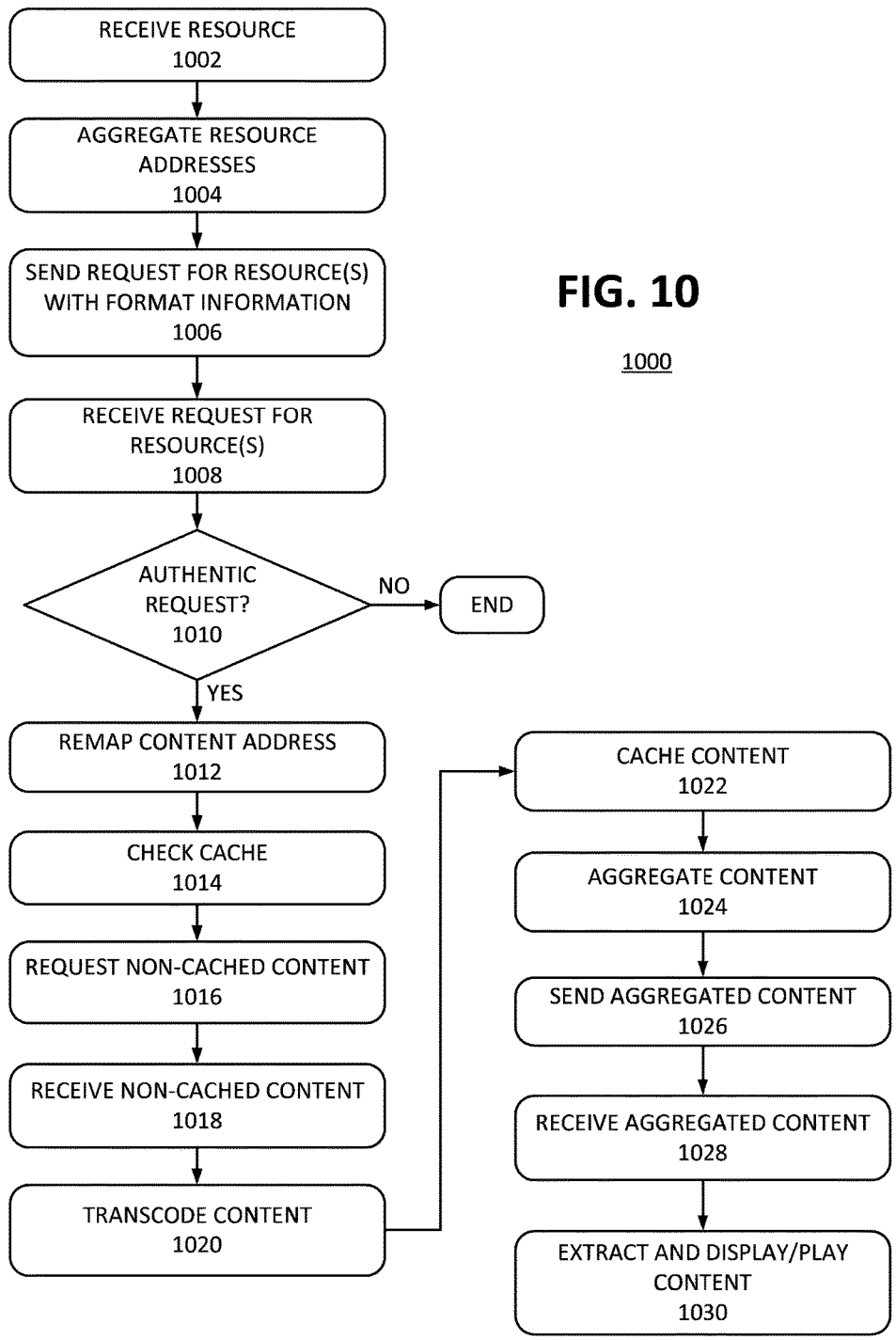
FIG. 10 is a flowchart of a process for requesting resources in a system with cache.
Figure 11:
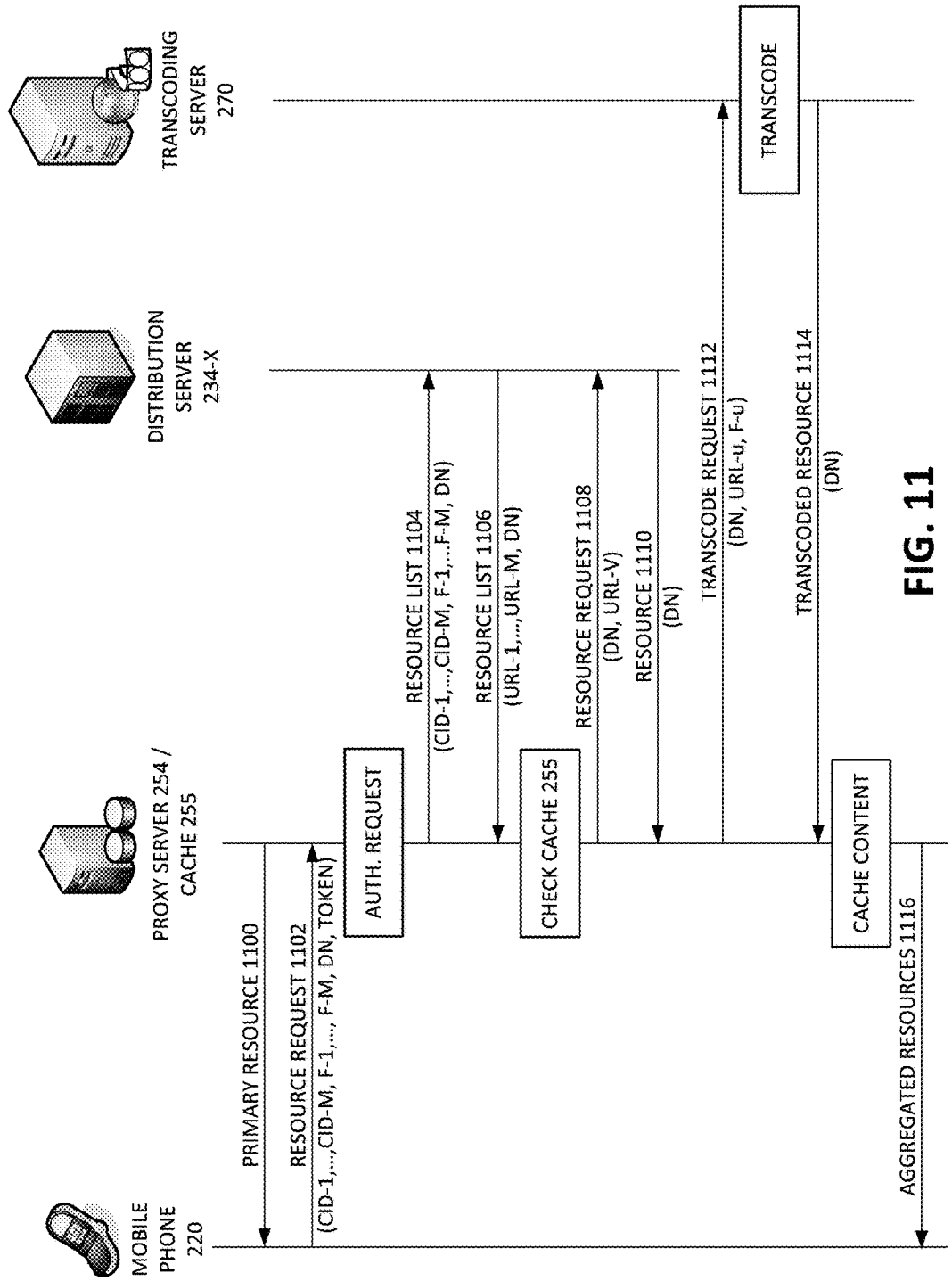
FIG. 11 is a diagram of exemplary network signals for requesting resources in a system with cache.

In other embodiments, network 200 may employ a cache (e.g., cache 255) when a user device (e.g., devices 208-220) requests and receives resources (e.g., content). FIG. 10 is a flowchart of a process 1000 for requesting resources in a system with cache. FIG. 10 is discussed in relation to FIG. 11, which is a diagram of exemplary network signals for requesting resources in a system with cache. For simplification, proxy server 254 and cache 255 are combined as a single device as shown in FIG. 11. Process 1000 may begin when a user device, such as mobile phone 220, receives a resource that includes one or more addresses (e.g., IUDs, CIDs, URIs, URLs, etc.) of additional resources (block 1002). Referring to FIG. 11, mobile phone 220 receives a web page (e.g., music.verizon.com) as primary resource 1100 that includes CIDs, for example, that address images, video, and/or audio.

Similar to block 804 above, the addresses for the additional resources may be aggregated (block 1004). In one embodiment, the user device may aggregate the additional addresses into a single file. For example, mobile phone 220 (e.g., processing logic 420) may extract additional resource addresses (e.g., CIDs, URIs, URLs, etc.) from a web page being displayed on display 306. In another embodiment, the addresses may be grouped into multiple files, but, in this embodiment, fewer files than the number of additional resources. The file(s) may list the additional addresses using XML, for example.

A request for resource(s) may be sent (block 1006) from, for example, the user device to a proxy server. The request for resources may include the list of addresses from block 1004. In the example of FIG. 11, mobile phone 220 may send resource request 1102 to proxy server 254, which may include the aggregated addresses (e.g., CID-1 through CID-M). In one embodiment, the address list may include format information for one or more of the resources. For example, the format information may indicate "thumbnail" or "preview" and/or the size of the screen of mobile phone 220. As another example, the format information may indicate the resolution and/or size of the requested resource. In the example of FIG. 11, the format associated with each resource address is denoted F-1 through F-M.

In addition to a list of resources, request 1102 may include a token for authentication. In this example, the token may be the same token as passed to mobile phone 220 from proxy server 254 in token message 708 of process 600. The request for the resource(s) may be received (block 1008) by the proxy server from the user device, for example. Referring to FIG. 11, resource(s) request 902 may be received in proxy server 254. The authenticity of the request for resource(s) may be determined (block 1010). The authenticity of the request may be determined in a manner similar to that described above with respect to FIGS. 8 and 9. If the request for resource(s) is not authentic (block 1010: NO), then process 1000 may end.

If the request is authentic (block 1010: YES), then the resources addresses (e.g., CIDs) may be remapped (e.g., converted) (block 1012). Remapping includes converting a first type of resource address to another type of resource address. For example, a content identifier (CID) may be converted into a URL. Remapping may allow for shorter resource/content addressing for faster communications between device layer 202 and proxy layer 206. Referring to FIG. 11, proxy server 254 may send a resource list 1104 to distribution server 234-x. Resource list 1104 may include the CIDs associated with the requested content (e.g., CID-1 through CID-M) and the requested format information (e.g., F-1 through F-M). Distribution server 234-x may query a table that associates CIDs with URLs, for example. In response to content list 1104, distribution server 234-x may return a resource list 1106, which lists the resource addresses as URLs. In this embodiment, the URL may address the resource in the requested format or the resource in the format closest to the requested format.

A cache may be checked for the resources in the requested format (block 1014). In the example of FIG. 11, cache 255 may associate resources with URLs. Proxy server 254 may determine which resources, if any, have been cached in cache 255. For those resources that have been cached, proxy server 254 may retrieve those resources from cache 255.

Non-cached content may be requested (block 1016) by the proxy server 254, for example, from the distribution server 234-x. Proxy server 254 may request the content using the URLs returned in resource list 1106. As shown in FIG. 11, proxy server 254 may send a resource request 1108 to distribution server 234-x. Resource request 1108 may include the device number (DN) and URL (URL-V) of the non-cached resource.

The non-cached content may be received (block 1018) by the proxy server, for example. Referring to FIG. 11, distribution server 234-x may return a resource 1110 to proxy server 254. Resource 1110 may be accompanied with the device number (DN) associated with resource request 1108.

If the cached or received non-cached content is not in the requested format, the content may be transcoded into the requested format (block 1020). As shown in FIG. 11, proxy server 254 may send a transcode request 1108 to transcoding server 270. Transcode request 1112 may include the device number (DN), the URL (URL-u), and the format information (F-u) associated with the request. In one embodiment, transcode request 1112 may include the resource to be transcoded. Transcoding server 270 may transcode the resource identified in transcode request 1112 according to the format information (F-1) and may return transcoded resource 1114. Transcoded resource 1114 may include the device number (DN) associated with transcode request 1112.

The received and/or transcoded content may be cached (block 1022) by, for example, proxy server 254. Proxy server 254 may cache the transcoded content and/or the non-cached content in cache 255. The received resources (cached, transcoded, and/or non-cached) may be aggregated (block 1024) and the aggregated resources may be sent (block 1026) to the user device from the proxy server, for example. Referring to FIG. 11, proxy server 254 may send aggregated resources 1116 to mobile phone 220. The aggregated resources may be received (block 1028) by the user device. Referring to FIG. 11, mobile phone 220 may receive resource message 1116. The resources may be extracted (block 1030) and displayed or played, for example. Mobile phone 220 (e.g., processing logic 420) may extract the resources to display on display 306 of mobile phone 220 along with primary resource 1100.

As discussed above, in one embodiment, proxy layer 206 may include a memory-less or state-less layer. Any data or states stored in proxy layer 206, if lost, may be received from other layers and/or re-determined. In this embodiment, proxy layer 206 may act as a pass-through for device layer 202 and distribution layer 204. This embodiment may increase reliability. Proxy layer 206, however, may store data and/or states for redundancy and to improve performance. For example, if proxy layer 206 loses device information (e.g., a password, device number, cookie, name, etc.) it may receive this data from a user device (and/or a distribution server).

In one embodiment, content extraction function 276 may reduce the number of data calls between device layer 202 and proxy layer 206. In another embodiment, the aggregated address may be sent in fewer data calls than the number of resources, which may decrease latency. In yet another embodiment, content aggregation function 283 may reduce the number of data calls between device layer 202 and proxy layer 206. As disclosed, remapping may allow for shorter resource/content addressing for faster communications between device layer 202 and proxy layer 206.

In the preceding specification, various preferred embodiments have been described with reference to the accompanying drawings. For example, in some embodiments the user device may not be authenticated. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

While series of blocks have been described above with respect to different processes, the order of the blocks may differ in other implementations. Moreover, non-dependent acts may be performed in parallel.

It will be apparent that aspects of the embodiments, as described above, may be implemented in many different forms of software, firmware, and hardware in the embodiments illustrated in the figures. The actual software code or specialized control hardware used to implement these embodiments is not limiting of the invention. Thus, the operation and behavior of the embodiments of the invention were described without reference to the specific software code—it being understood that software and control hardware may be designed to the embodiments based on the description herein.

Further, certain portions of the invention may be implemented as "logic" that performs one or more functions. This logic may include hardware, such as an application specific integrated circuit, a field programmable gate array, a processor, or a microprocessor, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   receiving a web page in a user device, wherein the web page includes a plurality of Universal Resource Locators (URLs), wherein each of the plurality of URLs identifies one of a plurality of additional resources, and wherein the plurality of URLs includes a first URL and a second URL;
   extracting, in the user device, the first URL from the web page;
   extracting, in the user device, the second URL from the web page;
   aggregating, in the user device, the first URL and the second URL to generate a list of URLs including the first URL and the second URL;
   sending the list of URLs from the user device to a network device in a single request; and
   receiving the additional resources in the user device from the network device.

2. The method of claim 1, wherein receiving the additional resources in the user device includes receiving aggregated resources in the user device, wherein the aggregated resources include the additional resources, the method further comprising:
   extracting, in the user device, the additional resources from the aggregated resources.

3. The method of claim 2, further comprising:
   receiving the list of URLs in the network device;
   extracting the first URL and the second URL from the received list of URLs;
   requesting each of the additional resources identified by the first URL and the second URL;
   receiving the additional resources in the network device;
   aggregating the additional resources; and
   sending the aggregated additional resources to the user device.

4. The method of claim 1, further comprising:
   displaying a primary resource on a screen of the user device; and
   displaying or playing the additional resources with the primary resource.

5. The method of claim 1, wherein sending the list of URLs to the network device in the single request includes sending the list of URLs to the network device in a single data call.

6. The method of claim 1, wherein additional resources include a plurality of images.

7. The method of claim 1, further comprising:
   transcoding one or more of the additional resources received in the network device; and wherein sending the additional resources to the user device includes sending the transcoded one or more of the additional resources.

8. The method of claim 1, wherein the first URL and the second URL, as part of the web page, each represents a separate request from the user device to one or more network devices.

9. A method comprising:
transmitting a primary resource to a user device, wherein the primary resource includes a plurality of addresses, wherein each of the plurality of addresses identifies one of a plurality of additional resources, and wherein the plurality of address includes a first address and a second address;
receiving, in a single request, a list of addresses from the user device, wherein the list of addresses includes the first address and the second address and wherein the user device extracted the first address and the second address from the primary resource and aggregated the first address and the second address to generate the list of addresses;
extracting the first address and the second address from the received list of addresses;
requesting each of the additional resources identified by the first address and the second address;
receiving the additional resources; and
sending the additional resources to the user device.

10. The method of claim 9, further comprising:
aggregating the additional resources, and
wherein sending the additional resources to the user device includes sending the aggregated additional resources to the user device.

11. The method of claim 9, wherein the first address includes a first Universal Resource Locator (URL) and the second address includes a second URL.

12. The method of claim 9, wherein the plurality of addresses include a plurality of content identifiers (CIDs), the method further comprising:
converting each of the plurality of CIDs to one or more URL addresses.

13. The method of claim 10, further comprising:
transcoding one or more of the additional resources; and
wherein sending the aggregated additional resources to the user device includes sending the transcoded one or more of the additional resources.

14. The method of claim 9, wherein the first address and the second address, as part of the primary resource, each represents a separate request from the user device to one or more network devices.

15. A system comprising:
a network device comprising:
a transceiver to transmit a primary resource to a user device, wherein the primary resource includes a first address and a second address, wherein the first address and the second address each identifies one of a plurality of additional resources, wherein the transceiver is configured to receive a list of addresses in a single request, wherein the list of addresses includes the first address and the second address and wherein the user device extracted the first address and the second address from the primary resource and aggregated the first address and the second address to generate the aggregated addresses; and
a processor to extract the first address and the second address from the received list of addresses,
wherein the transceiver is configured to send a request for each of the additional resources identified by the first address and the second address, to receive the additional resources, and send the additional resources to the user device,
wherein the processor is configured to aggregate the additional resources, and
wherein the transceiver is configured to send the aggregated additional resources to the user device.

16. The system of claim 15, further comprising:
a user device comprising:
a processor to extract the first address from the primary resource, to extract the second address from the primary resource, and to aggregate the first address and the second address to generate the list of addresses;
a transceiver to send the list o addresses to the network device and receive the additional resources in the user device; and
a display to display the primary resource on a screen of the user device and display the additional resources with the primary resource.

17. The system of claim 16, wherein the user device further comprises:
a services layer including a purchasing function, application authentication function, and update management function, wherein the services layer is compatible with multiple operating systems and multiple hardware platforms.

18. The system of claim 16,
wherein the transceiver of the user device is configured to receive the aggregated additional resources in the user device, wherein the aggregated resources include the additional resources;
wherein the processor of the user device is further configured to
extract additional resources from the aggregated additional resources;
display the primary resource on the display of the user device; and
display or play the additional resources with the primary resource.

19. The system of claim 15, further comprising:
an authentication device including a transceiver to receive, from the network device, an authentication token associated with a session of a user, and to send a password associated with an account of the user to the network device.

20. The system of claim 19, further comprising:
a content device including a memory to store the plurality of additional resources.

* * * * *